(12) United States Patent  (10) Patent No.: US 9,092,684 B1
Sundaram et al.  (45) Date of Patent: Jul. 28, 2015

(54) WEARABLE SYSTEM FOR, AND METHOD OF, ELECTRO-OPTICALLY READING A SYMBOL AT WHICH A USER'S FINGER IS GENERALLY POINTED

(71) Applicant: SYMBOL TECHNOLOGIES, INC., Lincolnshire, IL (US)

(72) Inventors: Sundaresan Sundaram, Bangalore (IN); Kavya Babu, Bangalore (IN); Suresh Raj, Bangalore (IN); Sajan Wilfred, Kollam (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/591,966

(22) Filed: Jan. 8, 2015

(51) Int. Cl.
 *G06K 7/10* (2006.01)

(52) U.S. Cl.
 CPC ........ *G06K 7/10891* (2013.01); *G06K 7/10722* (2013.01); *G06K 7/10752* (2013.01)

(58) Field of Classification Search
 CPC . G06K 7/10891; G06K 9/00; G06K 7/10396; G06K 7/10722; G06K 7/10752; G06K 7/10762
 See application file for complete search history.

(56) References Cited

U.S. PATENT DOCUMENTS

| | | | |
|---|---|---|---|
| 4,766,299 A * | 8/1988 | Tierney et al. | 235/462.21 |
| 5,340,972 A * | 8/1994 | Sandor | 235/462.44 |
| 6,067,112 A | 5/2000 | Wellner et al. | |
| 6,202,930 B1 * | 3/2001 | Plesko | 235/462.43 |
| 7,047,051 B2 * | 5/2006 | Sackett et al. | 455/574 |
| 8,490,877 B2 | 7/2013 | Kearney | |
| 2003/0087681 A1 * | 5/2003 | Sackett et al. | 455/574 |
| 2005/0001035 A1 * | 1/2005 | Hawley et al. | 235/462.21 |
| 2006/0202950 A1 | 9/2006 | Lee et al. | |
| 2006/0238350 A1 | 10/2006 | Tessier | |
| 2008/0087734 A1 | 4/2008 | Wang | |
| 2012/0111945 A1 * | 5/2012 | Kearney | 235/462.11 |
| 2013/0287258 A1 | 10/2013 | Kearney | |

* cited by examiner

*Primary Examiner* — Daniel Walsh (57) ABSTRACT

An imaging reader is worn by a user. The reader has an imaging assembly that has a solid-state imager with an array of image sensors and a lens assembly. In a reading mode, the imaging assembly captures and projects light as an image onto the array. A controller detects a user's finger pointing at a symbol proximal to a tip of the finger in the image, and generates a control signal when the finger obstructs the symbol in the image. Upon receipt of the control signal, the controller automatically controls a drive to move the imager and/or a lens of the lens assembly to an adjusted position in which the symbol in the image is unobstructed by the finger. The unobstructed image of the symbol is processed into identifying data, and the data is transmitted away from the housing to a remote host device.

20 Claims, 6 Drawing Sheets

WEARABLE SYSTEM FOR, AND METHOD OF, ELECTRO-OPTICALLY READING A SYMBOL AT WHICH A USER'S FINGER IS GENERALLY POINTED

BACKGROUND OF THE INVENTION

The present disclosure relates generally to a wearable system for, and a method of, electro-optically reading a symbol by image capture, and, more particularly, to capturing and processing an image of the symbol unobstructed by a user's finger that is generally pointed at the symbol.

Solid-state imaging readers have been used, in both handheld and/or hands-free modes of operation, to electro-optically read targets, such as one- and two-dimensional bar code symbols, and/or non-symbols, such as documents, over a range of working distances relative to each reader. A typical imaging reader includes a housing having at least one light-transmissive window, and an imaging assembly that includes a solid-state imager or imaging sensor with an array of photocells or image sensors, which correspond to image elements or pixels in a field of view of the imager, and an imaging lens assembly for capturing return light scattered and/or reflected from the symbol being imaged over a range of working distances relative to the reader, and for projecting the return light onto the array to initiate capture of an image of each symbol. Such an imager may include a one- or two-dimensional charge coupled device (CCD) or a complementary metal oxide semiconductor (CMOS) device, with global or rolling exposure shutters, and associated circuits for producing and processing electrical signals corresponding to a one- or two-dimensional array of pixel data over the field of view.

In order to increase the amount of the return light captured by the array, for example, in dimly lit environments or for far-out symbols located relatively far from the window, the imaging reader generally also includes an illuminating light assembly for illuminating the symbol with illumination light over an illumination field for reflection and scattering from the symbol. In contrast to laser-based readers that direct a visible laser beam on the symbol, it is not always certain whether an imaging reader is pointed directly at the symbol and, as a result, the known imaging reader may also have an aiming light assembly for projecting an aiming light pattern or mark, such as a "crosshair" pattern, with aiming light from an aiming light source, e.g., an aiming laser or one or more light emitting diodes (LEDs), through aiming lenses on the symbol prior to imaging. The user aims the aiming pattern on the symbol to be imaged during an aiming mode prior to imaging and reading.

Although generally satisfactory for their intended purpose of reading symbols by image capture, the known handheld imaging readers have not proven to be altogether satisfactory, because, among other things, one of the user's hands is occupied with holding and aiming the reader, thereby preventing the user from using both his or her hands in such other operations as sorting, lifting, and carrying objects, such as packages, bearing the symbols. To perform such operations that are particularly desirable in the package delivery field, the user typically puts the reader down somewhere on some available support surface, thereby sometimes facilitating loss of the reader, or places the reader in a designated support, such as a cradle or a holster, thereby losing non-negligible time during the placement and retrieval of the reader. The use of the aiming light assembly not only consumes electrical energy and is costly, but its aiming light also may be bothersome to people in the vicinity of the reader.

To counter the handling drawback, the art has proposed not occupying one's hand by wearing a laser-based reader somewhere on a user's person, such as his or her head, arm, wrist, or finger, or on a pair of glasses, or on some article of clothing, such as a hat or helmet. To counter the energy wastage, cost and annoyance of the aiming light assembly employed in an imaging reader, the art has proposed having the user point his or her outstretched finger at the symbol. In the latter case, however, the outstretched finger sometimes overlies the symbol in the captured image and, as a result, the symbol cannot always be successfully read due to its at least partial obstruction and concealment by the outstretched finger. To make matters worse, the user has no advance knowledge that his or her outstretched finger is at least partly concealing the symbol and is compromising reader performance. This situation is, of course, unpredictable and unacceptable for a high performance reader.

Accordingly, there is a need to efficiently, rapidly and reliably image and read a symbol at which a user's finger is generally pointed, and to generally improve overall reading performance of wearable imaging readers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to a wearable system for electro-optically reading symbols, e.g., one- or two-dimensional bar code symbols, by image capture. The system comprises an imaging reader that includes a housing worn by a user, a light-transmissive window supported by the housing, and an imaging assembly supported by the housing. The imaging assembly includes a solid-state imager with an array of image sensors and a lens assembly. The imager may constitute a one- or two-dimensional charge coupled device (CCD) or a complementary metal oxide semiconductor (CMOS) device. The lens assembly may constitute one or more lenses, e.g., a Cooke triplet.

A controller, e.g., a programmed microprocessor, is operative, in a reading mode of operation of the reader, for controlling the imaging assembly to capture light entering the window over a field of view and to project the captured light as an image onto the array. The controller is also operative for detecting a user's finger generally pointing at a symbol proximal to a tip of the finger in the image, and for generating a control signal when the finger obstructs the symbol in the image and interferes with the symbol being read by the reader. A drive is operatively connected to the imaging assembly. The controller is further operative, in response to receipt of the control signal, for automatically controlling the drive to move the imager and/or at least one lens of the lens assembly relative to the housing, to an adjusted position in which the symbol in the image is unobstructed by the finger. The controller then processes the unobstructed image of the symbol into identifying data, and transmits the data away from the housing. A host device, e.g., a mobile computer, remote from the housing, receives the data transmitted by the controller.

The imaging assembly has an optical axis, and, in the preferred embodiment, the drive includes a pan motor for sweeping the imaging assembly in a plane generally perpendicular to the optical axis, a tilt motor for tilting the imaging assembly in an inclined orientation relative to the optical axis, and a zoom motor for moving one or more of the lenses of the lens assembly along the optical axis to focus the image onto the array. Advantageously, an illuminating light assembly is supported by the housing, and illuminates the field of view during the reading mode. Preferably, the controller controls the imaging assembly to capture the light as a plurality of successive images, and a memory buffers and stores the successive images. The controller detects the user's finger as an elongated object having an end in the image, and also detects a region of interest closest to the end of the elongated object in the image, and also processes the unobstructed image of the symbol in the detected region of interest. To improve detection of the user's finger, a finger identifier, such as a band, ring, finger cot, thimble, or the like, may be worn thereon, or a predefined marker, such as a black round spot, an arrow, or the like, may be marked on the finger, and the controller detects the user's finger by detecting the identifier.

During the reading mode, the controller energizes the illuminating light assembly, operates at a reading clock speed, and captures the light as a plurality of successive images at a reading frame rate onto the array. In a reduced power mode of operation of the reader, the controller deenergizes the illuminating light assembly, slows the clock speed, and decreases the frame rate to conserve electrical power supplied by an on-board battery. The reader operates in the reduced power mode by default, and switches from the reduced power mode to the reading mode either upon detection of the user's finger, or upon detection of the identifier, or upon detection of a predetermined motion gesture by the user, e.g., a head motion, as detected by an accelerometer connected to the controller.

Another aspect of the present disclosure relates to a method of electro-optically reading symbols by image capture. The method is performed by wearing a housing of an imaging reader on a user, supporting a window on the housing, and supporting a solid-state imager with an array of image sensors and a lens assembly of an imaging assembly on the housing. The method is further performed by controlling the imaging assembly, in a reading mode of operation of the reader, to capture light entering the window over a field of view and to project the captured light as an image onto the array; by detecting a user's finger generally pointing at a symbol proximal to a tip of the finger in the image; and by generating a control signal when the finger obstructs the symbol in the image and interferes with the symbol being read by the reader. The method is still further performed by operatively connecting a drive to the imaging assembly; by automatically controlling the drive, in response to receipt of the control signal, to move at least one of the imager and a lens of the lens assembly relative to the housing, to an adjusted position in which the symbol in the image is unobstructed by the finger; by processing the unobstructed image of the symbol into identifying data; by transmitting the data away from the housing; and by receiving the transmitted data at a host device remote from the housing.

Figure 1:
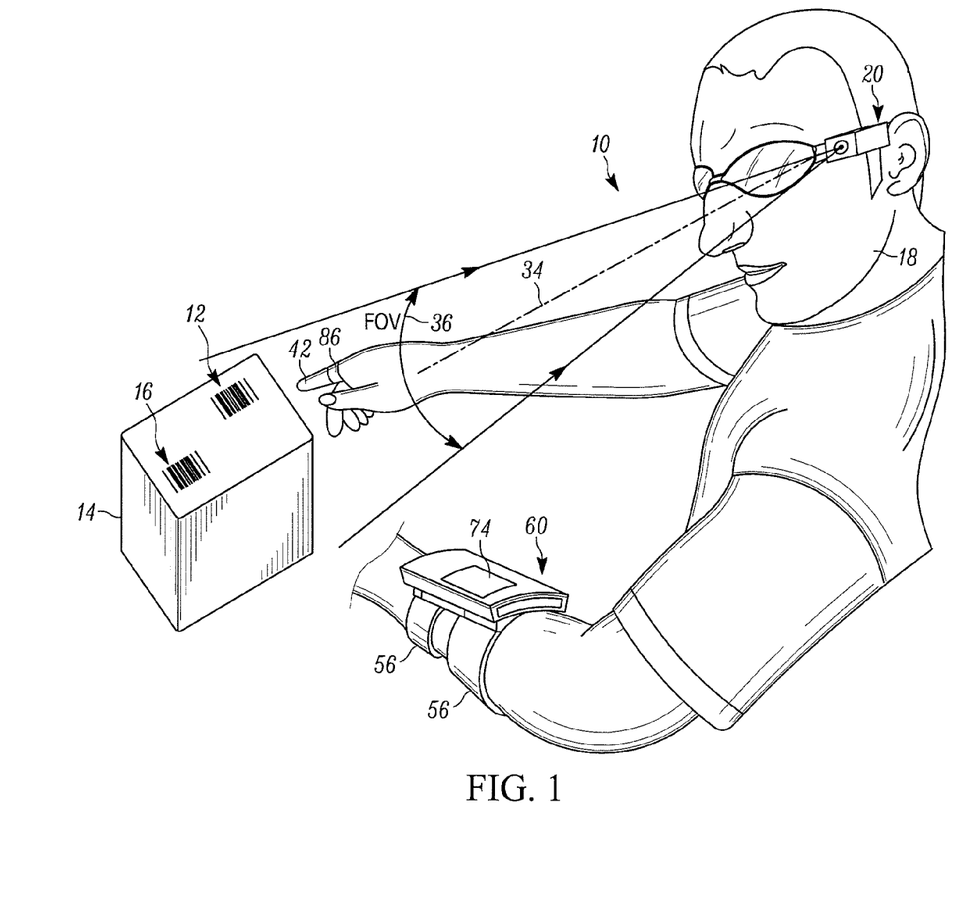
FIG. 1 is a perspective view of a wearable system for electro-optically imaging and reading a symbol at which a user's finger is generally pointed in accordance with the present disclosure.

Turning now to the drawings, reference numeral 10 in FIG. 1 generally identifies a wearable system for electro-optically reading symbols, e.g., one- or two-dimensional bar code symbols, such as a Universal Product Code (UPC) symbol 12, by image capture. The symbol 12 is associated with, and/or borne by, any object to be identified, such as the shipping carton 14 illustrated in FIG. 1. The carton 14 may have additional symbols, such as a secondary UPC symbol 16. The system 10 comprises an imaging reader 20 and a host device 60. The components of the imaging reader 20 and the host device 60 are described below and illustrated in connection with FIG. 3.

Figure 3:
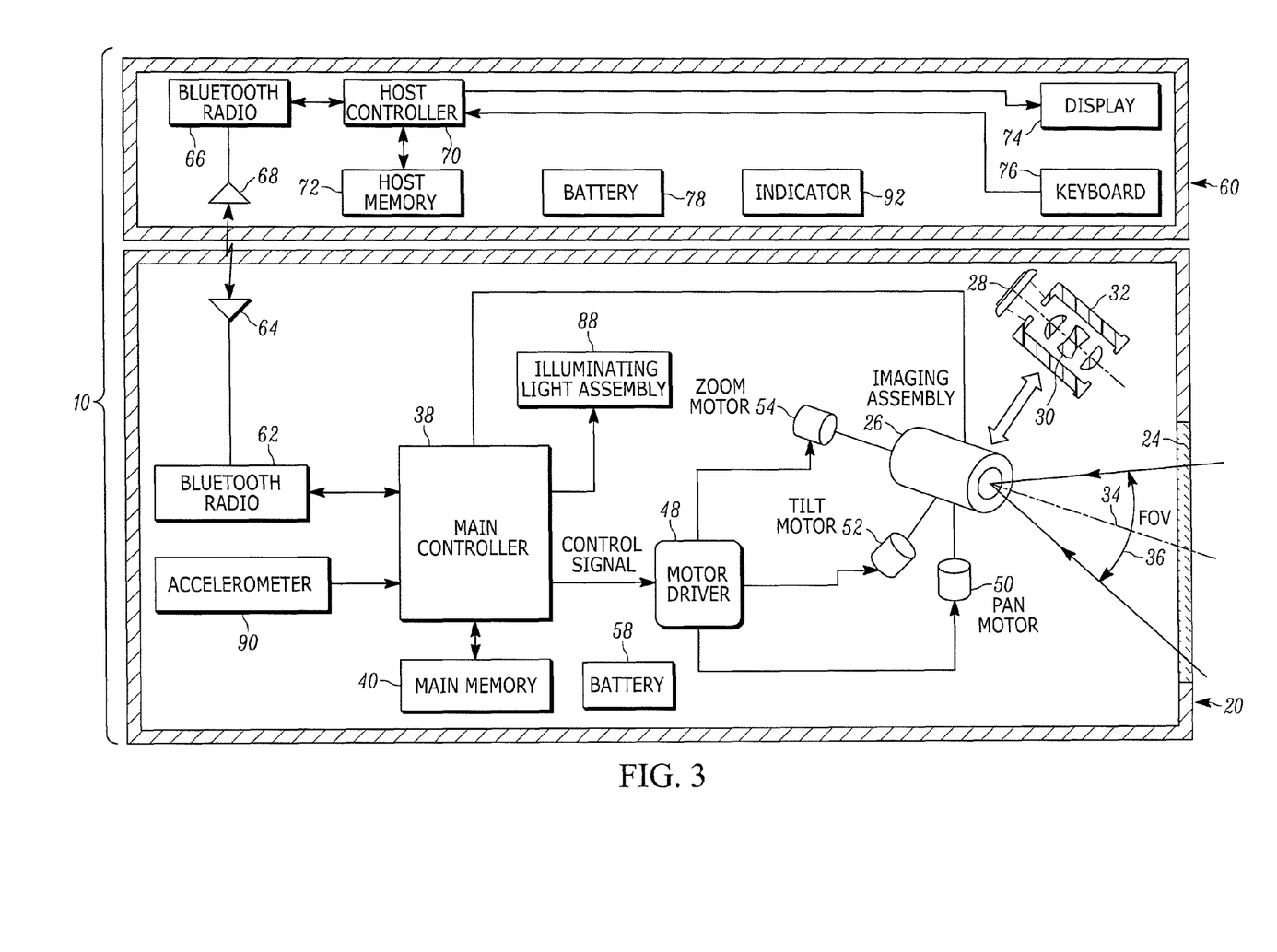
FIG. 3 is a block diagram depicting components of the system of FIG. 1.

The imaging reader 20 includes a housing 22 worn on, and jointly movable with, a user, especially on the user's head 18, a light-transmissive window 24 supported by the housing 22, and an imaging assembly 26 also supported by the housing 22. As best seen in FIG. 3, the imaging assembly 26 includes a solid-state imager 28 with an array of image sensors or pixels, preferably of submegapixel or supermegapixel size, and a lens assembly 30 mounted in an optical barrel 32. The imager 28 may constitute a one- or two-dimensional charge coupled device (CCD) or a complementary metal oxide semiconductor (CMOS) device having either a global or a rolling exposure shutter, and is analogous to the imagers or imaging sensors used in electronic digital cameras. The lens assembly 30 may constitute one or more lenses, e.g., the illustrated Cooke triplet, arranged along an optical axis 34.

The imager 28 and the lens assembly 30 are together operative for capturing return light scattered and/or reflected from any object in its field of view (FOV) 36 along the optical axis 34 through the window 24 and over a range of working distances relative to the window 24, and the lens assembly 30 is operative for projecting the captured light as one or more images onto the array of the imager 28. The FOV 36 diverges away from the window 24 in both horizontal and vertical directions. The imager 28 is controlled by a main controller 38, e.g., a programmed microprocessor, in various modes of operation of the reader 20, as described below. During a reading mode, the imager 28 needs about 16-33 milliseconds to read each image and operates at a frame rate of about 30-90 frames per second. A main memory 40 buffers and stores the successive images for subsequent processing, as described below.

Although FIG. 1 depicts that the reader 20 is exteriorly mounted on an arm of a pair of glasses worn on the user's head 18, this is merely exemplary, because it will be understood that many other mounting configurations may be employed in the practice of the invention disclosed herein. For example, the reader 20 may be integrated in eyewear known as Google Glass, or may be mounted in a hat, cap, helmet or like headgear, or may be mounted in headphones or ear buds, or may be mounted in an elongated housing supported in a generally horizontal orientation by a user's ear. The reader 20 may also be mounted away from the user's head 18. For example, the reader may be mounted anywhere on the user's torso, e.g., on a shoulder, or on the user's chest or waist. Advantageously, the reader 20 may be mounted on a necklace draped around and suspended from the user's neck.

Figure 2:
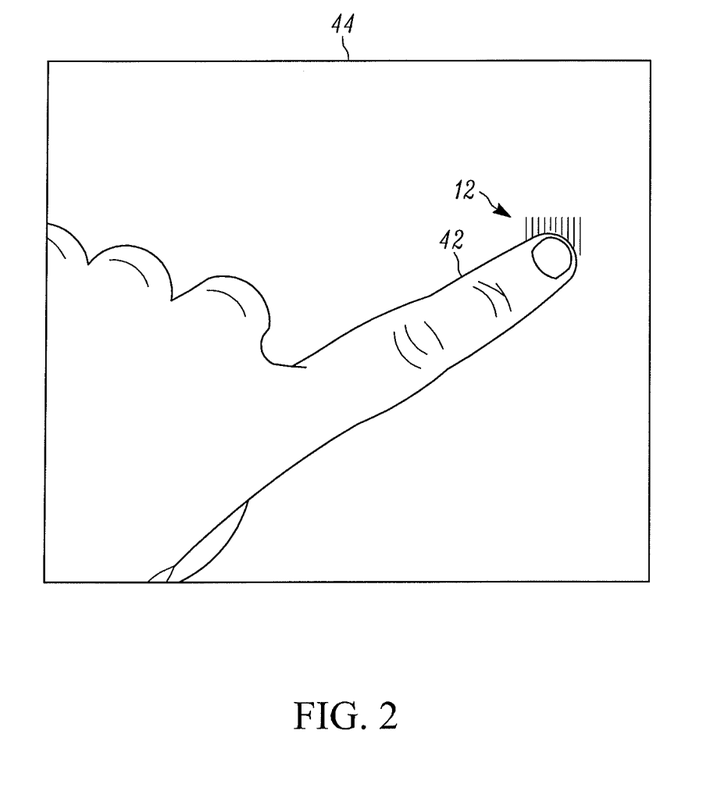
FIG. 2 is an enlarged view of an image captured by the system of FIG. 1 and depicting the user's finger obstructing the symbol desired to be read.

As described above, rather than employing an aiming light assembly in an imaging reader, it is known, as illustrated in FIG. 1, to have the user point his or her outstretched finger 42 at the symbol 12 to be read. However, as shown in FIG. 2, the outstretched finger 42 sometimes overlies the symbol 12 in an image 44 captured by the imaging assembly 26 and, as a result, the symbol 12 cannot always be successfully read due to its at least partial obstruction and concealment by the outstretched finger 42. To make matters worse, the user has no advance knowledge that his or her outstretched finger 42 is at least partly concealing the symbol 12 in the captured image 44 and is compromising reader performance.

Hence, in accordance with the present disclosure, the controller 38 is also operative for detecting the user's finger 42 generally pointing at the symbol 12 that is proximal to a tip of the finger 42 in the captured image 44, and for generating a control signal when the finger 42 obstructs the symbol 12 in the captured image 44 and interferes with the symbol 12 being read by the reader. In response to receipt of the control signal, a drive automatically moves the imager 28 and/or at least one lens of the lens assembly 30 relative to the housing 22, to an adjusted position in which, as illustrated in FIG. 4, the symbol 12 in an image 46 captured by the imaging assembly 26 is unobstructed by the finger 42.

The drive is operatively connected to the imaging assembly 26. The drive includes a motor driver 48 operatively connected to the controller 38, a pan motor 50 for sweeping the imaging assembly 26 in a plane generally perpendicular to the optical axis 34, a tilt motor 52 for tilting the imaging assembly 26 in an inclined orientation relative to the optical axis 34, and a zoom motor 54 for moving one or more of the lenses of the lens assembly 30 along the optical axis 34 to focus the image onto the array. Thus, one or more of the motors 50, 52 and 54 are driven by the driver 48 in response to receipt of the control signal from the controller 38 in order to capture a focused, unobstructed image of the symbol 12. Once the image of the symbol 12 is focused and unobstructed, the controller 38 then processes the focused, unobstructed image of the symbol 12 into identifying data, and transmits the data away from the housing to the aforementioned host device 60, e.g., a mobile computer, remote from the housing 22.

The host device 60 is preferably a mobile computer, and advantageously, as shown in FIG. 1, is strapped by wrist straps 56 onto a wrist of the user's other hand. The host device 60 in FIG. 1 is operatively connected to the reader 20 by either a wired cable or a wireless link. As shown in FIG. 3, the preferred connection is a wireless Bluetooth link, in which a Bluetooth radio 62 and an antenna 64, both provided in the reader 20, are in wireless radio frequency communication with another Bluetooth radio 66 and another antenna 68, both provided in the host device 60. The host device 60 can also be configured as a cellphone, a smartphone, a personal digital assistant ("PDA"), an e-reader, a tablet, a slate, a watch, or a portable computer and, depending on the configuration, need not be strapped onto the wrist, but could be carried on one's clothing, e.g., in one's pocket or purse. The device 60 has, among other things, a host controller 70, a host memory 72, a display 74, a keyboard 76, and an indicator 92 for either visually or audibly indicating that a successful reading of the symbol 12 has occurred, or that a successful reading of the symbol 12 has not occurred. In the illustrated wireless configuration, the reader 20 has an on-board, rechargeable battery 58 to supply electrical power to the components of the reader 20, and the host device 60 has an on-board, rechargeable battery 78 to supply electrical power to the components of the host device 60.

Figure 4:
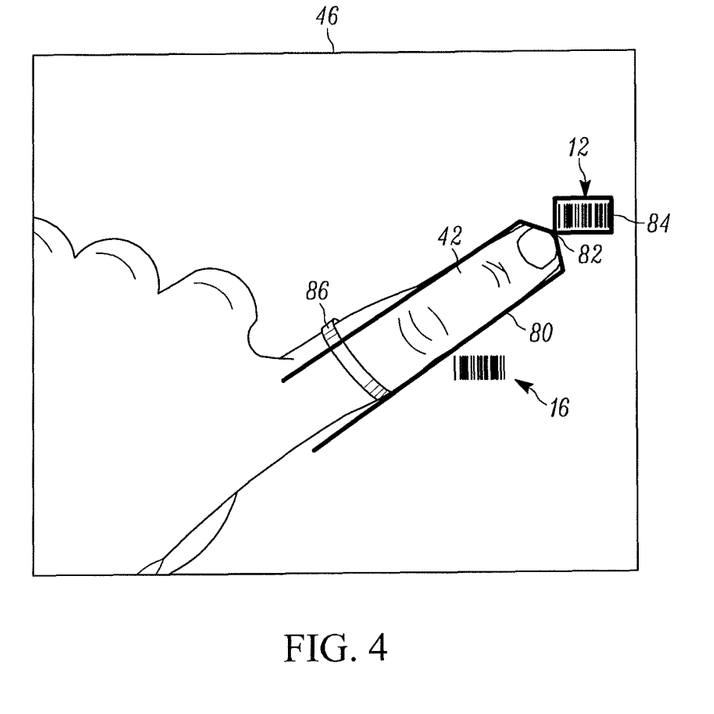
FIG. 4 is a view analogous to FIG. 2, after the system of FIG. 1 has been adjusted such that the user's finger is not obstructing the symbol in the captured image.

As shown in FIG. 4, the controller 38 detects the user's finger 42 as an elongated object bounded by boundary lines 80 having a pointed end 82 in the captured image 46, and also detects a generally rectangular region of interest (ROI) 84 closest to the end 82 of the elongated object in the captured image 46, and also processes the unobstructed image of the symbol 12 in the detected ROI 84. The controller 38 will ignore the secondary symbol 16 in the captured image 46, because the secondary symbol 16 is not located within the ROI 84. To improve detection of the user's finger 42, a finger identifier, such as a band or ring 86, or a finger cot, or a thimble, or the like, may be worn thereon, or a predefined marker, such as a black round spot, or an arrow, or the like, may be marked on the finger 42, and the controller 38 detects the presence and direction of the user's finger 42 by detecting the identifier. Advantageously, the ring 86 or the marker is provided with a distinctive color or pattern that facilitates its detection in the captured image 46.

Advantageously, an energizable illuminating light assembly 88 is also supported by the housing 22, and illuminates the FOV 36 during the aforementioned reading mode. The illuminating light assembly includes illumination light sources or light emitting diodes (LEDs), and illumination lens assemblies to uniformly illuminate the symbol 12 with illumination light when energized by the controller 38. During the reading mode, the controller energizes the illuminating light assembly for a short time period of, for example, 500 microseconds or less, operates at a reading clock speed, and energizes the imaging assembly 26 to collect illumination light reflected and/or scattered from the symbol 12 substantially only during said time period as a plurality of successive images at a reading frame rate of, for example, about 30-90 frames per second.

To conserve electrical power supplied by the on-board battery 58, the controller 38 configures the reader 20 to operate in a reduced power mode, in which the controller 38 deenergizes the illuminating light assembly 88, and/or slows the clock speed of the controller 38, and/or decreases the frame rate to, for example, about 10 frames per second. The reader 20 operates in the reduced power mode by default, and the controller 38 switches from the reduced power mode to the reading mode either upon detection of the user's finger 42, or upon detection of a finger identifier, such as the ring 86, on the user's finger 42, or upon detection of a predetermined motion gesture by the user, such as a motion by the head 18, as detected by an accelerometer 90 mounted in the reader 20 and connected to the controller 38.

Figure 5:
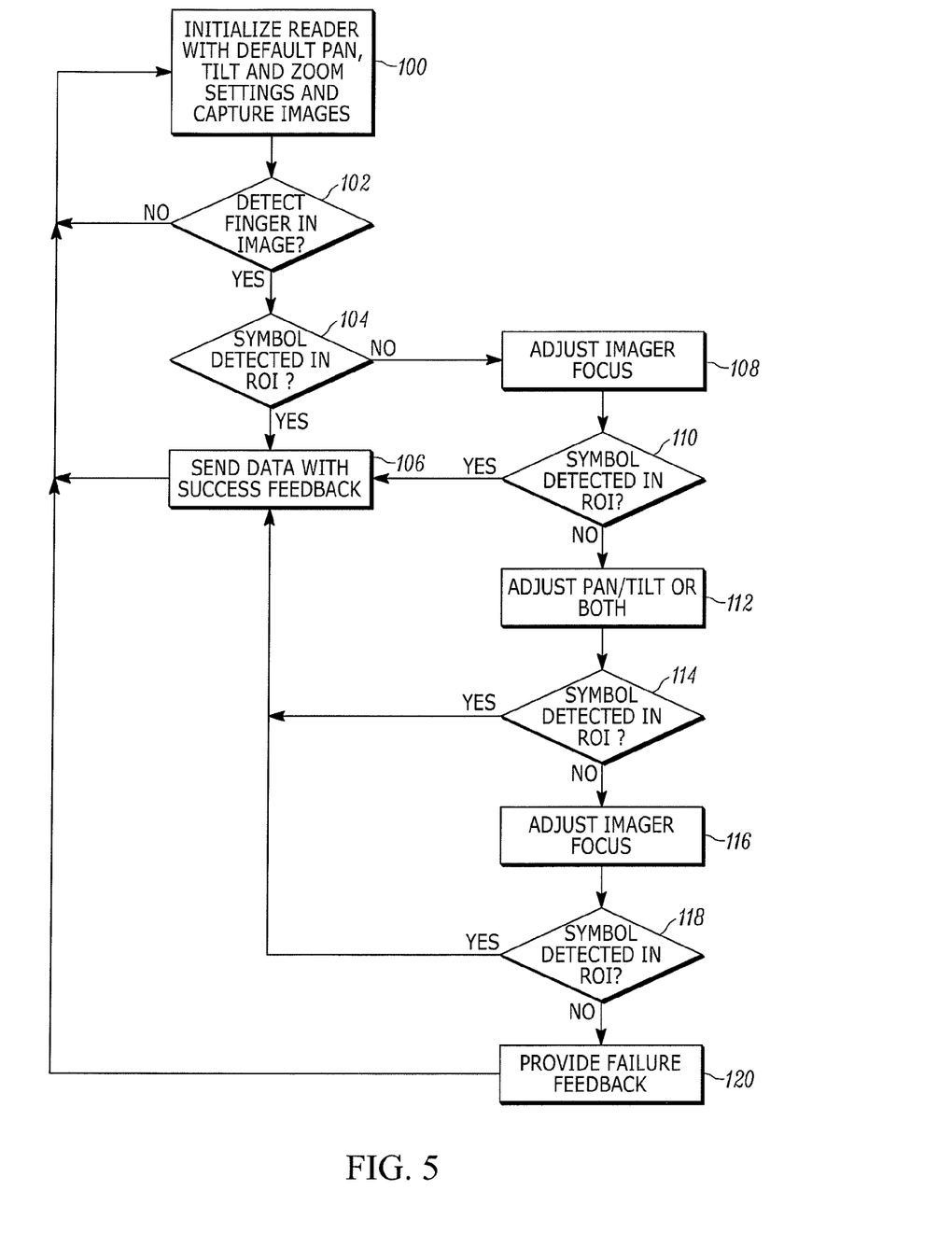
FIG. 5 is a flow chart depicting steps performed in a method of adjusting the system of FIG. 1 in accordance with the present disclosure.

Turning now to the flow chart of FIG. 5, a method of electro-optically reading symbols by image capture is performed, in an initial step 100, by initializing the reader 20 with initial pan, tilt, and zoom settings for the motors 50, 52, and 54, and by capturing successive images 46 in a reading mode. If the user's finger 42 is not detected in the captured image 46 in step 102, then the controller 38 returns to step 100. If the user's finger 42 is detected in the captured image 46 in step 102, then the symbol 12 is attempted to be detected in the ROI 84 in step 104. If the symbol 12 is detected in the ROI 84, then the symbol is processed and decoded into identifying data that is sent to the host device 60, and the indicator 92 indicates that the symbol 12 has been successfully read in step 106. If the symbol 12 is not detected in the ROI 84, then the control signal is generated, and the drive motors are actuated, as described below.

In step 108, the zoom motor 54 is actuated to focus the captured image. If the symbol 12 is detected in the ROI 84 in step 110, then the symbol is processed in step 106. If the symbol 12 is not detected in step 110, then the pan and/or the tilt motors 52,54 are actuated to capture the captured image in step 112. If the symbol 12 is detected in the ROI 84 in step 114, then the symbol is processed in step 106. If the symbol 12 is not detected in step 114, then the zoom motor 54 is actuated to focus the captured image in step 116. If the symbol 12 is detected in the ROI 84 in step 118, then the symbol is processed in step 106. If the symbol 12 is not detected in step 118, then a failure feedback signal is generated in step 120.

Figure 6:
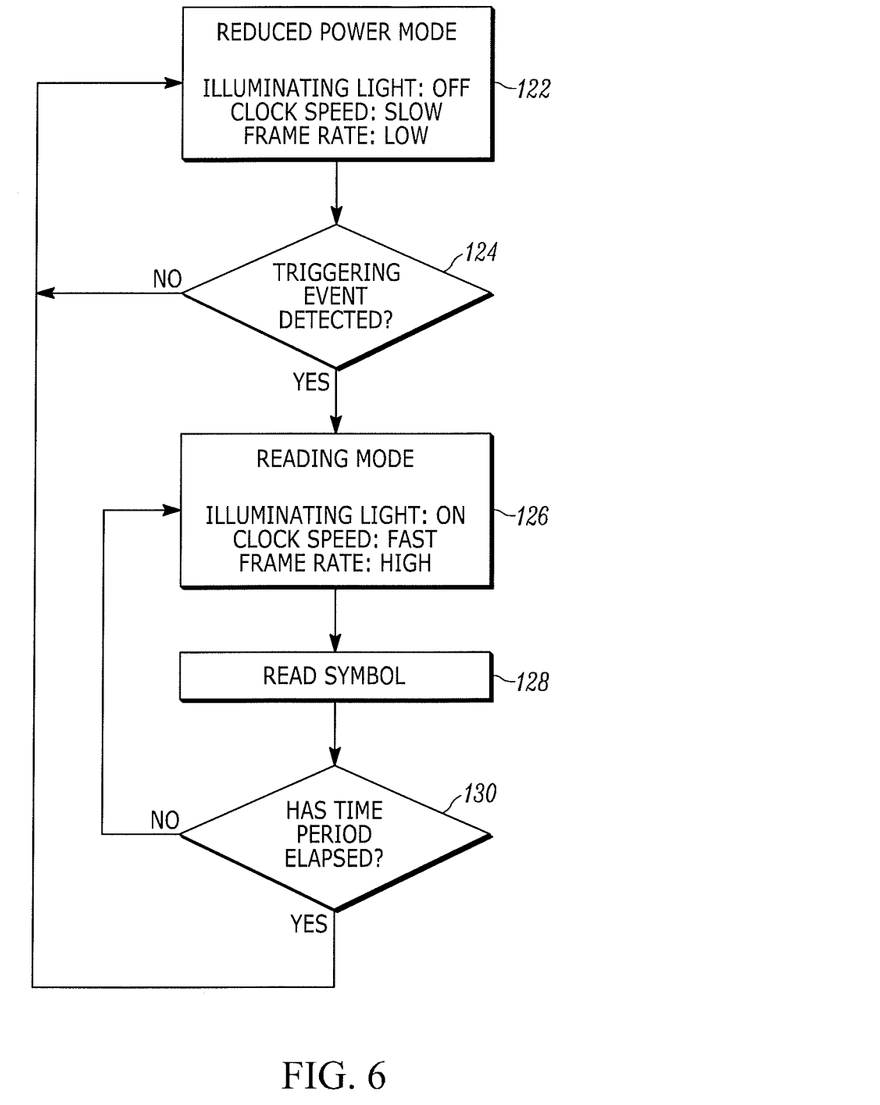
FIG. 6 is a flow chart depicting steps performed in a method of switching between different modes of operation of the system of FIG. 1 in accordance with the present disclosure.

The flow chart of FIG. 6 describes the different modes of operation. Step 122 depicts a default or reduced power mode in which electrical power supplied by the on-board battery 58 is conserved by deenergizing the illuminating light assembly 88, and/or slowing the clock speed of the controller 38, and/or lowering the frame rate. In step 124, a triggering event is detected. This triggering event can be detection of the user's finger 42, or detection of the finger identifier, such as the ring 86, on the user's finger, or detection of a predetermined motion gesture of the user's body, such as the head 18, as detected by the accelerometer 90. If the triggering event is detected, then in step 126, the controller 138 configures the reader to enter the reading mode, in which the illuminating light assembly 88 is energized, the clock speed of the controller 38 is faster, and the frame rate is increased. In step 128, the symbol 12 is read. After elapse of a predetermined time period in step 130, the controller 138 configures the reader to either turn off completely or to resume the default reduced power mode.

In the foregoing specification, specific embodiments have been described. However, one of ordinary skill in the art appreciates that various modifications and changes can be made without departing from the scope of the invention as set forth in the claims below. For example, in a wired configuration between the reader 20 and the host device 60, the battery 58 may be removed, and power for the reader 20 can be supplied from the host device 60. Also, the functions of the controller 38 and the memory 40 can be made the responsibility of the host controller 70 and the memory 72, respectively. Thus, two separate controllers and two separate memories are not required. In some implementations, a pointed utensil, such as a pen or pointer, can assume the task assigned to the finger 42. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A wearable system operative to electro-optically reading symbols by image capture, the system comprising:
   an imaging reader including a housing worn by a user, a light-transmissive window supported by the housing, and an imaging assembly supported by the housing and having a solid-state imager with an array of image sensors and a lens assembly;
   a controller operative, in a reading mode of operation of the reader, to control the imaging assembly to capture light entering the window over a field of view and to project the captured light as an image onto the array, and to detect a user's finger generally pointing at a symbol proximal to a tip of the finger in the image, and to generate a control signal when the finger obstructs the symbol in the image and interferes with the symbol being read by the reader;
   a drive operatively connected to the imaging assembly;
   the controller being operative, in response to receipt of the control signal, to automatically control the drive to move at least one of the imager and a lens of the lens assembly relative to the housing, to an adjusted position in which the symbol in the image is unobstructed by the finger, to process and decode the unobstructed image of the symbol into identifying data, and to transmit the data away from the housing; and
   a host device remote from the housing, operative to receive the data transmitted by the controller.

2. The system of claim 1, wherein the imaging assembly has an optical axis, and wherein the drive includes a pan motor operative to sweep the imaging assembly in a plane generally perpendicular to the optical axis, and a tilt motor for tilting the imaging assembly in an inclined orientation relative to the optical axis.

3. The system of claim 2, wherein the drive includes a zoom motor operative to move the lens of the lens assembly along the optical axis to focus the image onto the array.

4. The system of claim 1, wherein the controller controls the imaging assembly to capture the light as a plurality of successive images onto the array, and a memory accessible by the controller for storing the successive images.

5. The system of claim 1, wherein the controller detects the user's finger as an elongated object having an end in the image, and wherein the controller detects a region of interest closest to the end of the elongated object in the image, and wherein the controller processes the unobstructed image of the symbol in the detected region of interest.

6. The system of claim 1, and an identifier associated with the user's finger, and wherein the controller detects the user's finger by detecting the identifier.

7. The system of claim 1, wherein the controller configures the reader to enter a standby mode of operation after elapse of a time period after transmitting the data away from the housing.

8. The system of claim 1, and an illuminating light assembly supported by the housing and energized by the controller for illuminating the field of view during the reading mode; and a battery for supplying electrical power; and wherein the controller is operative at a reading clock speed, during the reading mode, to capture the light as a plurality of successive images at a reading frame rate; and wherein the controller is further operative, in a reduced power mode of operation of the reader, to deenergize the illuminating light assembly, to slow the clock speed, and to decrease the frame rate to conserve electrical power supplied by the battery.

9. The system of claim 8, wherein the controller configures the reader to operate in the reduced power mode by default, and switches from the reduced power mode to the reading mode upon detection of the user's finger.

10. The system of claim 8, and an accelerometer connected to the controller and supported by the housing operative to detect a predetermined motion gesture of the user, and wherein the controller configures the reader to operate in the reduced power mode by default, and switches from the reduced power mode to the reading mode upon detection of the predetermined motion gesture.

11. A method of electro-optically reading symbols by image capture, the method comprising:
    wearing a housing of an imaging reader on a user;
    supporting a light transmissive window on the housing;
    supporting a solid-state imager with an array of image sensors and a lens assembly of an imaging assembly on the housing;
    controlling the imaging assembly, in a reading mode of operation of the reader, to capture light entering the window over a field of view and to project the captured light as an image onto the array;
    detecting a user's finger generally pointing at a symbol proximal to a tip of the finger in the image;
    generating a control signal when the finger obstructs the symbol in the image and interferes with the symbol being read by the reader;
    operatively connecting a drive to the imaging assembly;
    automatically controlling the drive, in response to receipt of the control signal, to move at least one of the imager and a lens of the lens assembly relative to the housing, to an adjusted position in which the symbol in the image is unobstructed by the finger;
    processing and decoding the unobstructed image of the symbol into identifying data;
    transmitting the data away from the housing; and
    receiving the transmitted data at a host device remote from the housing.

12. The method of claim 11, wherein the drive is controlled by sweeping the imaging assembly in a plane generally perpendicular to an optical axis the imaging assembly, and by tilting the imaging assembly in an inclined orientation relative to the optical axis.

13. The method of claim 12, wherein the drive is controlled by moving the lens of the lens assembly along the optical axis to focus the image onto the array.

14. The method of claim 11, wherein successive images are projected onto the array, and storing the successive images.

15. The method of claim 11, wherein the detecting of the user's finger is performed by detecting the finger as an elongated object having an end in the image; and detecting a region of interest closest to the end of the elongated object in the image, and wherein the processing of the unobstructed image of the symbol is performed in the detected region of interest.

16. The method of claim 11, and associating an identifier with the user's finger, and wherein the detecting of the user's finger is performed by detecting the identifier.

17. The method of claim 11, and configuring the reader to enter a standby mode of operation after elapse of a time period after transmitting the data away from the housing.

18. The method of claim 11, and illuminating the field of view during the reading mode; and supplying electrical power; and wherein the light is captured as a plurality of successive images at a reading frame rate and at a reading clock speed during the reading mode; and not illuminating the field of view, slowing the clock speed, and decreasing the frame rate in a reduced power mode of operation of the reader to conserve the supplied electrical power.

19. The method of claim 18, wherein the reader is configured to operate in the reduced power mode by default, and switching from the reduced power mode to the reading mode upon detection of the user's finger.

20. The method of claim 18, wherein the reader is configured to operate in the reduced power mode by default, and switching from the reduced power mode to the reading mode upon detection of a predetermined motion gesture by the user.

* * * * *